United States Patent [19]

Catron

[11] Patent Number: 5,655,848
[45] Date of Patent: Aug. 12, 1997

[54] SUSPENSION BALL JOINT

[75] Inventor: Willard E. Catron, New Castle, Ind.

[73] Assignee: Chrysler Corporation, Auburn Hills, Mich.

[21] Appl. No.: 440,869

[22] Filed: May 15, 1995

[51] Int. Cl.$^6$ .................................................. F16C 11/00
[52] U.S. Cl. ............................ 403/137; 403/124; 403/135
[58] Field of Search ................................ 403/122, 124, 403/125, 126, 135, 137

[56] References Cited

U.S. PATENT DOCUMENTS

| | | | |
|---|---|---|---|
| 381,348 | 4/1888 | Eaton | 403/135 X |
| 1,888,966 | 11/1932 | Babcock | 403/122 |
| 2,259,067 | 10/1941 | Hufferd et al. | 403/128 |
| 2,398,848 | 4/1946 | Newey | 403/138 |
| 2,848,260 | 8/1958 | Moskovitz | 403/126 X |
| 2,954,993 | 10/1960 | Scheublein, Jr. et al. | 403/135 X |
| 3,005,647 | 10/1961 | Collier | 403/125 |
| 3,175,834 | 3/1965 | Wallace et al. | 277/212 R |
| 3,210,106 | 10/1965 | Templeton | 403/125 |
| 3,245,706 | 4/1966 | Rowlett | 403/135 |
| 3,375,028 | 3/1968 | Patton | 403/126 |
| 3,389,928 | 6/1968 | Wehner | 403/36 |
| 3,429,598 | 2/1969 | Scheublein, Jr. et al. | 403/135 X |
| 3,589,756 | 6/1971 | Pruvot | 403/124 |
| 4,113,396 | 9/1978 | Smith | 403/138 |
| 4,241,463 | 12/1980 | Khovaylo | 403/135 X |
| 4,358,211 | 11/1982 | Goodrich, Jr. et al. | 403/27 |
| 4,431,330 | 2/1984 | Darnell | 403/122 |
| 4,466,755 | 8/1984 | Smith | 403/63 |
| 4,806,040 | 2/1989 | Gill et al. | 403/124 X |
| 4,974,985 | 12/1990 | Glatzel | 403/114 |

FOREIGN PATENT DOCUMENTS 1-312218  12/1989  Japan ..................................... 403/124

*Primary Examiner*—Anthony Knight
*Assistant Examiner*—Andrea Chop
*Attorney, Agent, or Firm*—Thomas G. Pasternak

[57] ABSTRACT

A ball and socket pivot joint includes a housing socket, having upper and lower open ends concentrically disposed about a socket axis, receiving a ball stud including an integral stem extending through the socket lower open end with a lower semi-spherical portion of the ball stud seated on a socket lower bearing seat. The socket upper open end is closed by a pressure member disposed between a housing cap and a pressure plate wherein the pressure plate provides an upper bearing seat for an upper semi-spherical surface of the ball stud. The ball stud lower surface is defined by a pivot center having a first radius of curvature on the socket axis while its upper surface is defined by a variable preload center on the stem axis and having a second radius of curvature a predetermined dimension greater than the first radius of curvature. With the ball joint in a neutral mode the socket and stem axes coincide such that the variable preload center is located on both axes and below the ball stud pivot center. As the ball stud pivots through its full angular travel its upper surface exerts a progressively greater force on the pressure plate causing the pressure member to progressively increase preload on the ball stud. The invention provides less preload and angular torque during middle range movement while obviating unseating of the ball stud during extreme angular movement with consequent high preload resisting high angular torque.

6 Claims, 2 Drawing Sheets

SUSPENSION BALL JOINT

BACKGROUND OF THE INVENTION

This invention relates to ball and socket pivot joints and more particularly to preloaded ball and socket pivot joints providing variable preload.

With reference to prior art FIG. 1 a conventional metal ball and socket pivot joint is shown at 10' designed for mechanical devices such as automotive suspension systems. The ball joint 10' includes a one-piece ball stud unit 12' received in a housing 13' formed with a socket 21' having an upper opening 14' and a lower opening 15' concentrically aligned on socket principal axis A'. The ball stud unit includes a ball-shaped head 16' having a stem 18' extending therefrom through the housing lower opening 15' The head 16' has its lower semi-spherical portion seated on a lower bearing seat 20'. The housing socket 21' has an upper cylindrical-shaped portion 22' terminating in the upper opening 14' closed by annular cap 24' An upper pressure plate, shown schematically at 26', is formed with an upper bearing seat (not shown) seating a top portion of the head 16'. A rubber pressure ring 36', compressed between the upper cap 24' and the pressure plate 26' exerts a predetermined preload on the ball stud 12'. The pressure ring 36' is preloaded to both take up wear of the bearing surfaces and to prevent unseating of the ball stud 12' during extreme angular movements of the ball stud.

A "side effect" of increasing the ball joint preload is a corresponding increase in angular torque as the amount of angulation increases between the elements interconnected by the joint. It is desirable in automotive suspension systems to reduce the angular torque in a middle range of ball stud angular movement which corresponds to moderate driving speeds and/or passenger loads. At high driving speeds and/or passenger loads, however, the amount of angulation increases between the suspension elements interconnected by the ball joint. As the ball stud approaches its maximum angular movement, increased ball joint preloading is necessary to avoid unseating of the ball stud. Accordingly, a variable preloading arrangement for a suspension ball joint is desirable for both maintaining minimal preload in the middle range of ball stud angular movement while increasing preload during extreme ball stud angular movement.

SUMMARY OF THE INVENTION

It is a feature of the present invention to provide a variable preloaded pivot ball joint wherein the preload is increased during extreme angular movements obviating unseating of the joint ball stud while achieving a reduced preload during the ball stud's middle range of angular travel.

It is another feature of the present invention to provide a variable preloaded ball joint for an automotive suspension system wherein the preload is reduced in the middle range of angular movements during moderate vehicle speeds and/and or light vehicle loads and wherein the preload is progressively increased as the ball stud approaches its maximum angular movements resulting from higher vehicle speeds and/or heavier vehicle loads.

It is still another object of the present invention to provide an inexpensive arrangement for adapting a conventional preloaded pivot ball joint for an automotive vehicle suspension system achieving variable preloading by increasing the radius of the ball stud upper semi-spherical surface while retaining its lower semi-spherical surface pivot center, whereby the upper surface exerts a progressively increased load on the ball joint upper pressure plate as the ball stud moves through its full travel.

These and other objects, features and advantages of the invention will be more fully understood from the following detailed description of the invention taken together with the accompanying drawings.

DETAILED DESCRIPTION OF THE INVENTION

Figure 1:
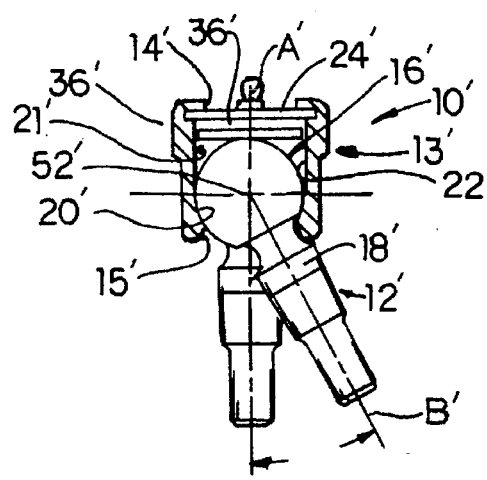
FIG. 1 is a vertical sectional schematic view, partly in elevation, of a prior art full ball and socket joint having a conventional preload arrangement showing the ball stud in both its neutral position and pivoted to its extreme angular position.
Figure 2A:
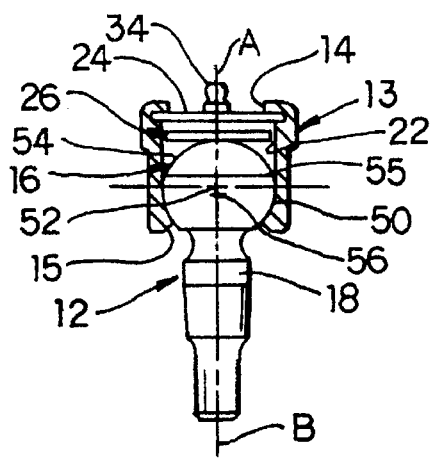
FIG. 2A is a vertical sectional schematic view, partly in elevation of a ball and socket joint, with a one-piece ball stud, having a variable preload arrangement in accordance with the present invention showing the ball stud in its neutral position.
Figure 2B:
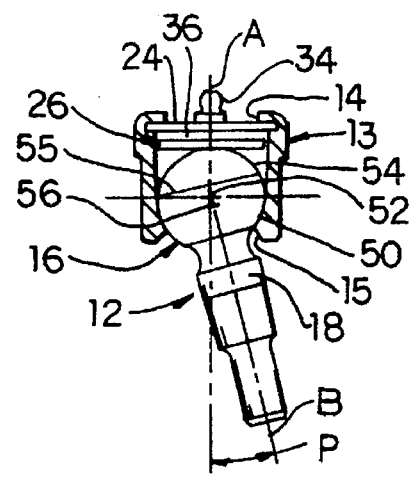
FIG. 2B is a view similar to FIG. 2A showing the ball stud pivoted to a middle range angular position relative to the housing principal axis.
Figure 2C:
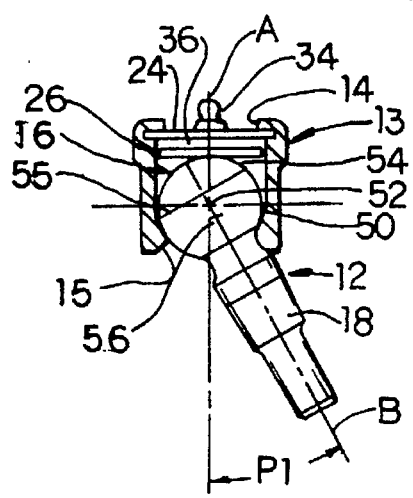
FIG. 2C is a view similar to FIG. 2A showing the ball stud pivoted to its extreme angular position relative to the housing principal axis.
Figure 3:
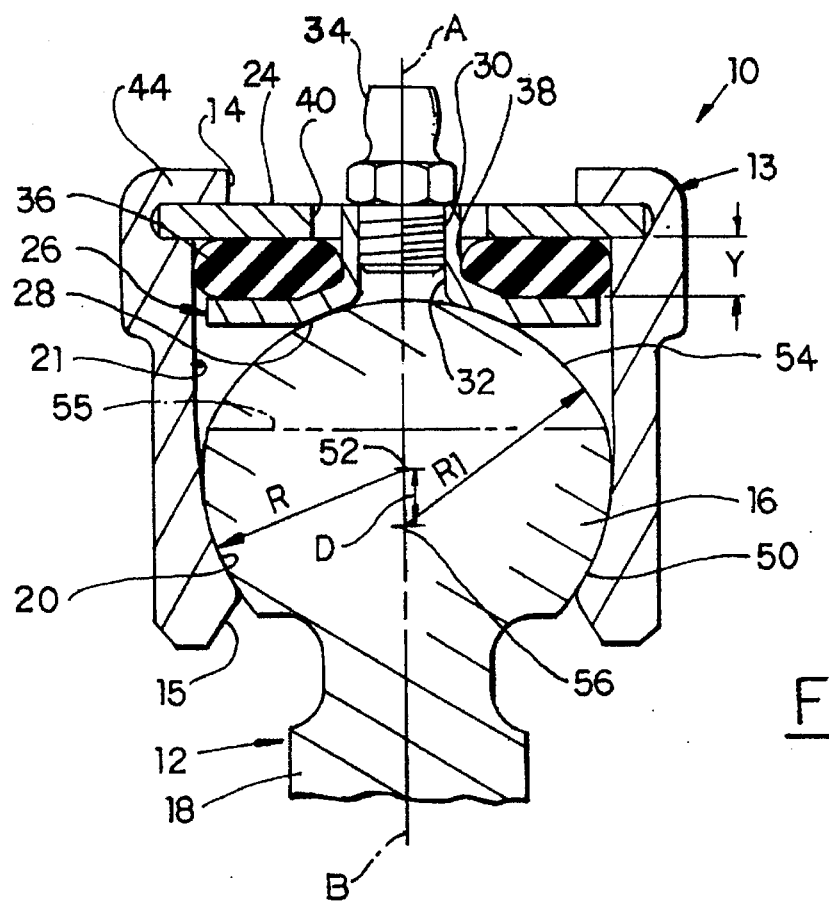
FIG. 3 is a fragmentary enlarged vertical sectional view, partly in elevation, of a ball and socket joint having a variable preloaded one-piece ball stud in accordance with the present invention.

Referring now to FIGS. 2A, 2B, 2C, and 3 of the drawings, there is shown a first embodiment of the present invention. With reference to FIG. 3, a ball and socket pivot joint, indicated generally at 10, comprises a one-piece ball stud unit 12 received in a generally cylindrically-shaped housing 13. The housing is formed with an upper open end 14 and a lower open end 15 with its socket concentrically aligned on housing principal axis "A". The ball stud unit 12 includes a substantially full ball-like head 16 and generally cylindrical-shaped stem, partially indicated at 18, shown protruding through the lower open end 15. The head 16 has a lower portion seated on a semi-spherical lower bearing seat 20 of housing socket, generally indicated at 21.

The ball joint housing socket 21 has an upper cylindrical shaped socket portion 22 which terminates in the housing upper open end 14 shown covered by annular rolled-in retainer cap 24. An upper bearing seat, in the form of a pressure plate 26, is formed with a central concave upper bearing seat surface 28 which seats an upper arcuate surface portion of the head 16. The pressure plate 28 is formed with an upwardly extending tubular portion 30, concentrically disposed on the socket principal axis "A", having an internally threaded bore 32 receiving a removable plug or grease fitting 34.

An elastomeric pressure pad or ring 36, which in the disclosed embodiment is of rubber material, has a center hole 38 sized for receiving the tubular portion 30 therethrough. The retainer cap 24 has clearance hole 40 through which the pressure plate tubular portion 30 extends with the retainer cap 24 positioned on housing upper annular internal shoulder 42. During manufacture of the ball joint an external load is maintained on the cap 24 compressing the pressure ring 36 between the upper retainer cap and the lower pressure plate 26 while the assembly is fixedly retained on the housing by a spun-over peripheral lip flange 44. Thus the pressure plate 26 exerts a precise load on the ball joint by preloading the head 16 into engagement with both the lower bearing seat 20 and the upper bearing seat 28 by resilient means in the form of compressible rubber pressure ring 36.

The pressure ring 36 compensates for wear of the upper and lower bearing seat surfaces with the wear taken up by the compressive force of the rubber ring expansion. Further, the pressure ring 36 preload prevents unseating of the ball stud 12 during extreme angular movements of the ball stud 12 as seen in FIG. 2C wherein the ball stud axis "B" is shown pivoted it an extreme or maximum angle "P1" of the order of 28 degrees.

With reference to FIGS. 3 and 2A the ball stud 12 is shown in its neutral mode wherein the socket principal axis "A" coincides with the ball stud axis "B". The ball stud head 16 has a lower-half semi-spherical surface 50 defined by a pivot center 52 having a predetermined radius of curvature "R" about which the surface 50 is formed. The pivot center 52, in the ball joint neutral mode, is located on both the ball stud axis "B" and the socket principal axis "A". It will be noted in FIG. 3 that the ball stud head 16 is formed with an upper semi-spherical surface 54, located above its diametric juncture (dashed line 55), defined by preload center 56 having a radius of curvature "R1". The preload center 56 is shown located on the ball stud axis "B" a predetermined dimension "D" below the pivot center 52.

In the disclosed embodiment of FIG. 3 the pivot center 52 of ball stud lower semi-spherical surface portion 50 has a radius "R" while the preload center of head upper semi-spherical surface portion 54 has a radius "R1". FIGS. 2A, 2B, and 2C illustrate a specific test example of a variable preloading sequence wherein the radius of curvature "R" has a dimension of 15.25 mm and the radius of curvature "R1" has a dimension of 16.53 mm.

With reference to FIG. 2B it will be seen that upon the ball stud axis "B" being pivoted through an angle "P" of 14 degrees from the socket principal axis "A" the preload on the rubber pressure ring 36 increases. In FIGS. 2A with the ring 36 under a given preload the ring has a normal compressed thickness "Y" (FIG. 3) while in its FIG. 2B state the thickness of the ring is reduced by 0.1143 mm causing the preload to increase by 400 Newtons.

With reference to FIG. 2C the ball stud axis "B" angularity has been increased to an angle "P1" to 28 degrees from the socket principal axis "A" resulting in a progressive increase in the preload in a geometric manner on the pressure ring 36. In the FIG. 2C state the thickness "Y" of the ring is reduced by 0.454 mm causing the preload to increase by about 1589 Newtons. Thus, by doubling the angle "P" from 14 degrees to 28 degrees the variable preload has increased geometrically from 400 Newtons to 1589 Newtons, or by a factor of four. The resultant progressively increasing variable preload condition is desirable in obviating unseating of the ball stud 12 at such extreme angular movement shown in FIG. 2C.

Applicant's variable preload ball joint of the present invention is particularly useful in the automotive suspension and steering systems. That is, it provides a relatively small increase in ball joint preloading, and consequent small increase in joint angular torque, in a middle angularity range of about 10 to 18 degrees from the socket axis "A" corresponding to moderate vehicle driving speeds and/or vehicle passenger loads. For higher vehicle driving speeds, however, the invention provides a relatively large increase in ball joint preloading and consequent joint angular torque in a maximum or extreme angularity range of about 20 to 28 degrees from the socket neutral axis.

Figure 4:
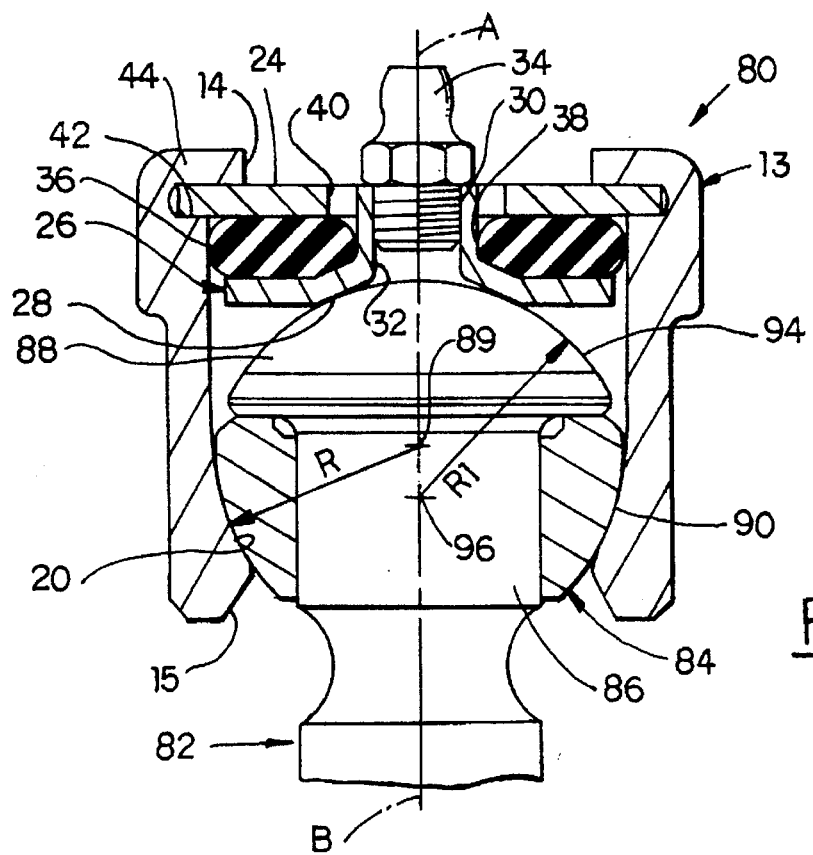
FIG. 4 is a view similar to FIG. 3 showing a ball and socket joint having a variable preloaded two-piece ball stud in accordance with the present invention.

Referring now to FIG. 4, there is illustrated a second embodiment of the present invention 80 which, instead of providing a one-piece ball stud 12 has a two-piece ball stud. The same reference numerals used in the description of the first embodiment will be used to describe the same or similar elements found in the second embodiment.

As in the first embodiment, the ball and socket joint 80 includes the identical housing 13, pressure plate 36, and cap 24. The ball joint 80 has a two-piece ball stud 82 substituted for the one-piece ball stud 12 of FIG. 3. A separate bearing ring 84 is shown surrounding ball stud stem 86 beneath stud head 88. The bearing ring 84 has a pivot center 89 and is formed with a semi-spherical surface 90 having the identical radius of curvature "R" as described in the first embodiment of FIG. 3. In a like manner the ball stem head 88 is formed with a semi-spherical surface 94 generated about preload center 96 having the identical radius of curvature "R1" of FIG. 3. In all other respects the ball joint 80 functions to provide a variable preload in an identical manner to the ball joint 10 of the first embodiment.

While the principles of the present invention in connection with the specific test device has been described, it is to be understood the foregoing detailed description has been made by way of example only and not as a limitation to the scope of the invention as set for in the accompanying claims.

What is claimed is:

1. A ball joint arrangement comprising:
   a housing having a socket concentrically disposed about a principal axis terminating in upper and lower open ends and formed with a lower bearing seat;
   a ball stud, defining an upper semi-spherical surface and a lower semi-spherical surface, having a stem extending through said lower open end, said stud defining a neutral mode with said lower surface seated on said lower bearing seat and said stem having an axis coinciding with the socket axis, said stud lower surface having a pivot center on said socket axis defined by a first radius of curvature;
   a housing cap fixed on said upper open end and resilient preload pressure means compressed between said cap and an upper bearing seat which bears against said ball stud upper surface with a predetermined preload force in said neutral mode, said upper surface having a variable preload center on said ball stem axis substantially below said lower surface pivot center and defined by a second radius of curvature having a predetermined dimension greater than said first radius of curvature;
   whereby as said ball stem undergoes angular movement from its neutral position said preload force progressively increases in a geometric manner wherein upon said ball stud approaching its full angular travel the resultant increase in preload obviates unseating of said ball stud.

2. The ball and socket joint as set forth in claim 1 wherein said ball stud is a one-piece unit defining a full ball head.

3. The ball and socket joint as set forth in claim 1 wherein said ball stud is a two-piece unit including an integral head portion defining said upper semi-spherical surface and a bearing ring surrounding said stem defining said lower semi-spherical surface.

4. The ball and socket joint as set forth in claim 1 wherein said resilient pressure means is in the form of an elastomeric pressure pad.

5. The ball and socket joint as set forth in claim 1 wherein said first radius of curvature has a predetermined dimension of the order of 15.25 mm and said second radius of curvature has a predetermined dimension of the order of 16.53 mm.

6. The ball and socket joint as set forth in claim 1 wherein said resilient pressure means is in the form of a rubber pressure pad.

* * * * *